United States Patent
Boersma

[11] Patent Number: 6,102,456
[45] Date of Patent: *Aug. 15, 2000

[54] OPERATING MEANS FOR AN OPEN ROOF CONSTRUCTION, AS WELL AS AN OPEN CONSTRUCTION

[75] Inventor: Egbert Boersma, Helmond, Netherlands

[73] Assignee: Inalfa Industries B.V., Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/960,634

[22] Filed: Oct. 29, 1997

[30] Foreign Application Priority Data

Nov. 20, 1996 [NL] Netherlands ............... 1004575

[51] Int. Cl.⁷ .................................................. E05C 17/32
[52] U.S. Cl. .................................... 292/263; 292/DIG. 5; 296/224
[58] Field of Search ................ 292/DIG. 5, 263, 292/202, 209, 256, 256.5, 137 B, 224

[56] References Cited

U.S. PATENT DOCUMENTS

| | | | |
|---|---|---|---|
| 4,216,983 | 8/1980 | Hough et al. | 292/263 |
| 4,257,632 | 3/1981 | DeStepheno | 292/263 |
| 4,422,688 | 12/1983 | Kameoka | 292/DIG. 5 |
| 4,422,689 | 12/1983 | Yamamoto et al. | 292/263 |
| 4,466,644 | 8/1984 | Wooten et al. | 292/DIG. 5 |
| 4,469,370 | 9/1984 | Petersen | 292/263 |
| 4,484,773 | 11/1984 | Lehne | 292/263 |
| 4,512,598 | 4/1985 | Coller | 292/DIG. 5 |
| 4,723,812 | 2/1988 | Masuda et al. | 292/263 |
| 4,747,630 | 5/1988 | Isomine et al. | 292/DIG. 5 |
| 4,923,232 | 5/1990 | Kawagoe et al. | 292/263 |
| 5,346,267 | 9/1994 | Betteridge et al. | 292/DIG. 5 |

FOREIGN PATENT DOCUMENTS

| | | |
|---|---|---|
| 0 059 859 | 9/1982 | European Pat. Off. . |
| 0 551 980 | 7/1993 | European Pat. Off. . |
| 2408889A1 | 9/1975 | Germany ............... 292/263 |
| 0306918 | 12/1988 | Japan ................... 292/256 |
| 2027792 | 2/1980 | United Kingdom ....... 292/DIG. 5 |

*Primary Examiner*—Teri Pham
*Attorney, Agent, or Firm*—Westman, Champlin & Kelly, P.A.

[57] ABSTRACT

An apparatus is provided for manually moving closure an open roof construction for a vehicle between closed and opened positions. This apparatus includes an element which is removably connected to a securing element to be secured to a frame of the open roof construction and which is held in a connected position by a locking device. The locking device includes a locking member which is displaceable between locking and unlocking positions. The locking member is loaded to a locking position by a spring and displacement from the locking position to the unlocking position has the same direction as the releasing movement of the element with respect to the securing element.

9 Claims, 3 Drawing Sheets

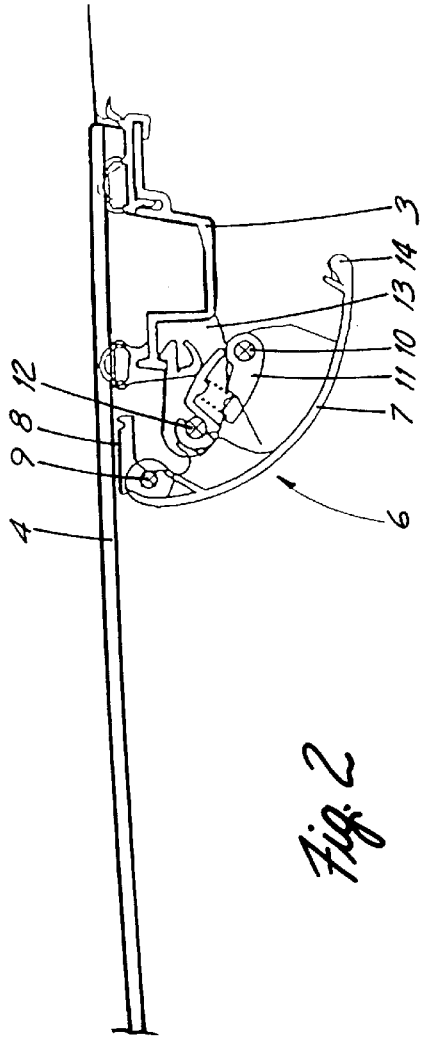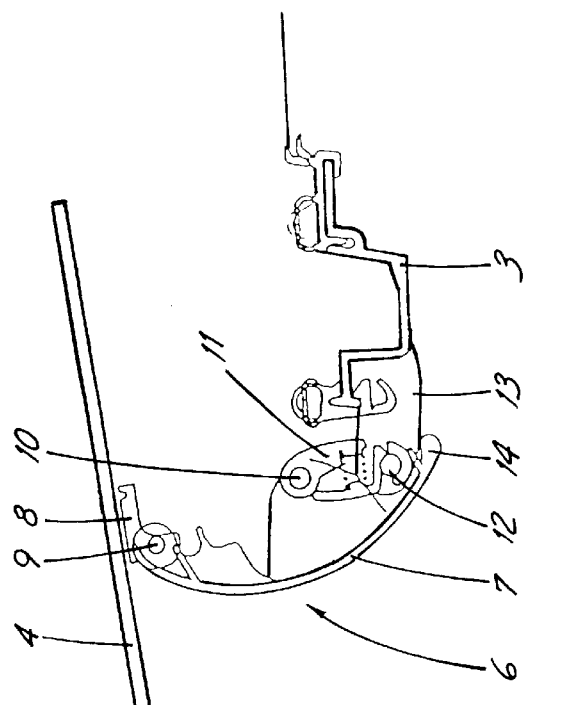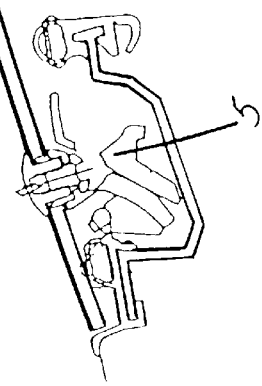

OPERATING MEANS FOR AN OPEN ROOF CONSTRUCTION, AS WELL AS AN OPEN CONSTRUCTION

BACKGROUND OF THE INVENTION

1. Field of the Invention

The present invention relates to an operating means for manually moving a closure means of an open roof construction for a vehicle between closed and open positions, said operating means comprising an element removably connected to a securing element to be secured to a frame of the open roof construction and being held in the connected position by locking means, said locking means including a locking member which is displaceable between locking and unlocking positions.

2. Description of the Related Art

Examples of such operating means can be found in EP-B-0 049 983, GB-A-2 135 727 and DE-A-33 22 762. These documents relate to so called sun roofs or pop-up roofs in which the transparent panel can be moved upwardly at the rear side in order to position it in a venting position by means of the operating means. In order to fully open the roof opening the panel can be removed, among other things by releasing the intermediate element from the securing element at the operating means. The above patent documents show various types of locking means in order to lock and unlock the intermediate element and the securing element with respect to each other.

SUMMARY OF THE INVENTION

The object of the present invention is to further improve the prior art operating means, in particularly the locking means thereof.

For this purpose, the operating means according to the invention is characterized in that the locking member is loaded to the locking position by a spring means, whereas the displacement from the locking position to the unlocking position has the same direction as the releasing movement of the element with respect to the securing element.

Due to the invention, the operational comfort is improved since operating the locking means and releasing the element from the securing element may be done in one movement.

A further improvement of the operational comfort is obtained if the securing element is constructed for operating the locking member from the locking position to the unlocking position when the element is mounted to the securing element.

In this manner, mounting the panel again requires only little manual actions as well, since the locking means is operated by the securing element and the locking means returns automatically to the locking position due to the spring load so that mounting and locking are done in one sequence.

The sub-claims define further developments of the present invention.

The invention will hereafter be further elucidated with reference to the drawings schematically showing an embodiment of the invention by way of example.

BRIEF DESCRIPTION OF THE DRAWINGS

FIG. 2 is an enlarged very schematic sectional view according to the line II—II in FIG. 1.

FIG. 3 is a sectional view corresponding to FIG. 2 but showing the open roof construction in the open position.

DESCRIPTION OF THE PREFERRED EMBODIMENT

Figure 1:
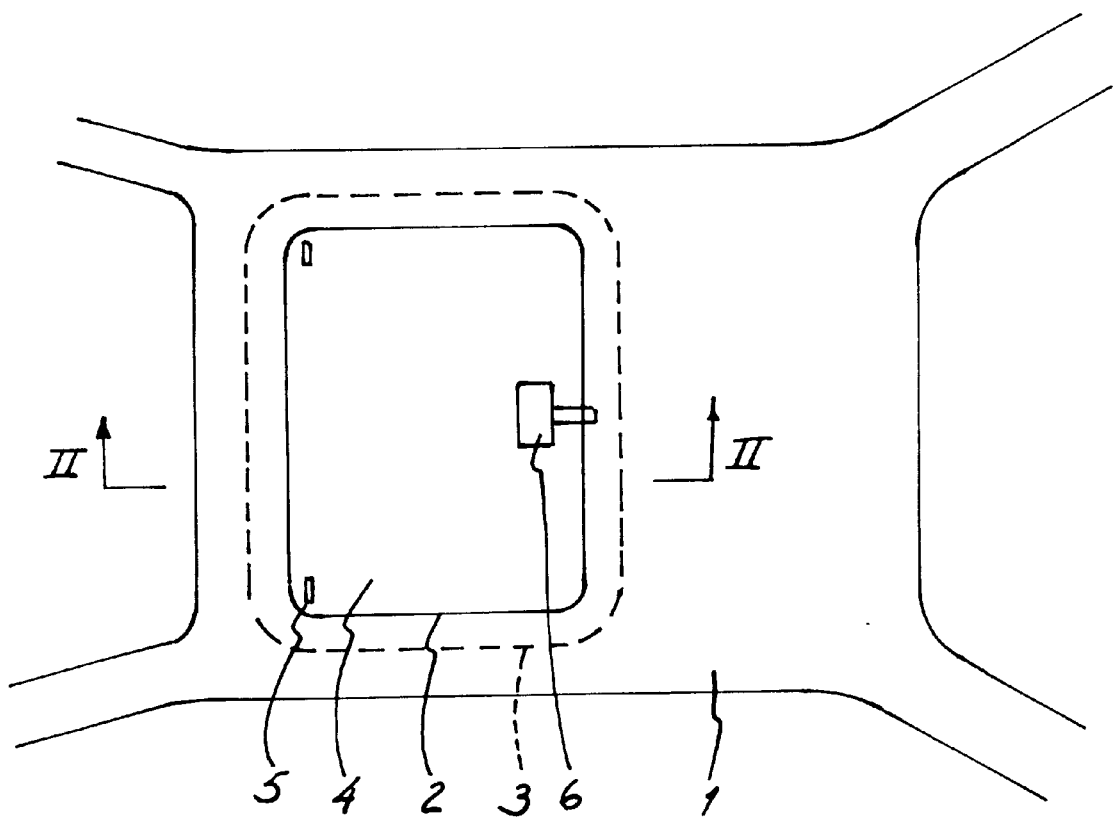
FIG. 1 is a very schematic plan view of a vehicle of which the fixed roof comprises an open roof construction having an operating means according to the present invention.

FIG. 1 schematically shows a part of a motor vehicle, in this case a passenger car, having a fixed roof 1 which is provided with an open roof construction. For this purpose there is arranged an opening 2 in the fixed roof 1, and a frame 3 or the like is secured to the fixed roof 1. This frame 1 movably supports a rigid panel 4, in this case made of more or less transparent material and fitting into the roof opening 2 and being able to close it in its closed position, possibly by means of seals.

In this case, the open roof construction is a so called sun roof in which the panel 4 is pivotally connected on its front side to the frame 3 by means of pivots 5 or the like and the rear side of which can be moved outwardly by means of an operating means 6 so that the panel is in a rearwardly inclined position when it is opened.

FIGS. 2 and 3 show an open roof construction very schematically in the closed position (FIG. 2) and in the open position (FIG. 3). These figures also show the operating means 6 which comprises three elements. The first element is a panel element 7, in this case constructed as a handgrip, which is pivotally connected to the panel 4, for which purpose the panel 4 comprises a mounting member 8 which is equipped with a pivot 9 which may be connected to the handgrip 7. The handgrip 7 is pivotally connected to the intermediate element 11 by means of a pivot 10, and the intermediate element 11 is pivotally connected to a pin 12 of a securing element 13 which is connected to the frame 3 in a manner not further shown.

As appears from FIG. 2 and 3, the operating means 6 is displaceable by means of the handgrip 7 between open and closed positions, wherein in both positions the operating means 6 may be moved beyond a dead center of the pivot construction formed by the elements 7 and 11, thereby taking a stable position. In both positions, the pivots 9, 10 and the pin 12 lie just beyond a position in which their center lines are lying in one plane. By gripping and pushing the lower edge 14 of the handgrip 7 forwardly the operating means 6 can be moved from the open to the closed position.

In order to open the roof opening 2 of the fixed roof 1 to a larger extent, the panel 4 is removably arranged so that the panel 4 can be removed entirely and the roof opening 2 is opened almost entirely. To be able to remove the panel 4, the front pivot 5 thereof is removably constructed in a particular manner not shown, whereas the operating means 6 is removably connected to the frame 3.

Figure 4:
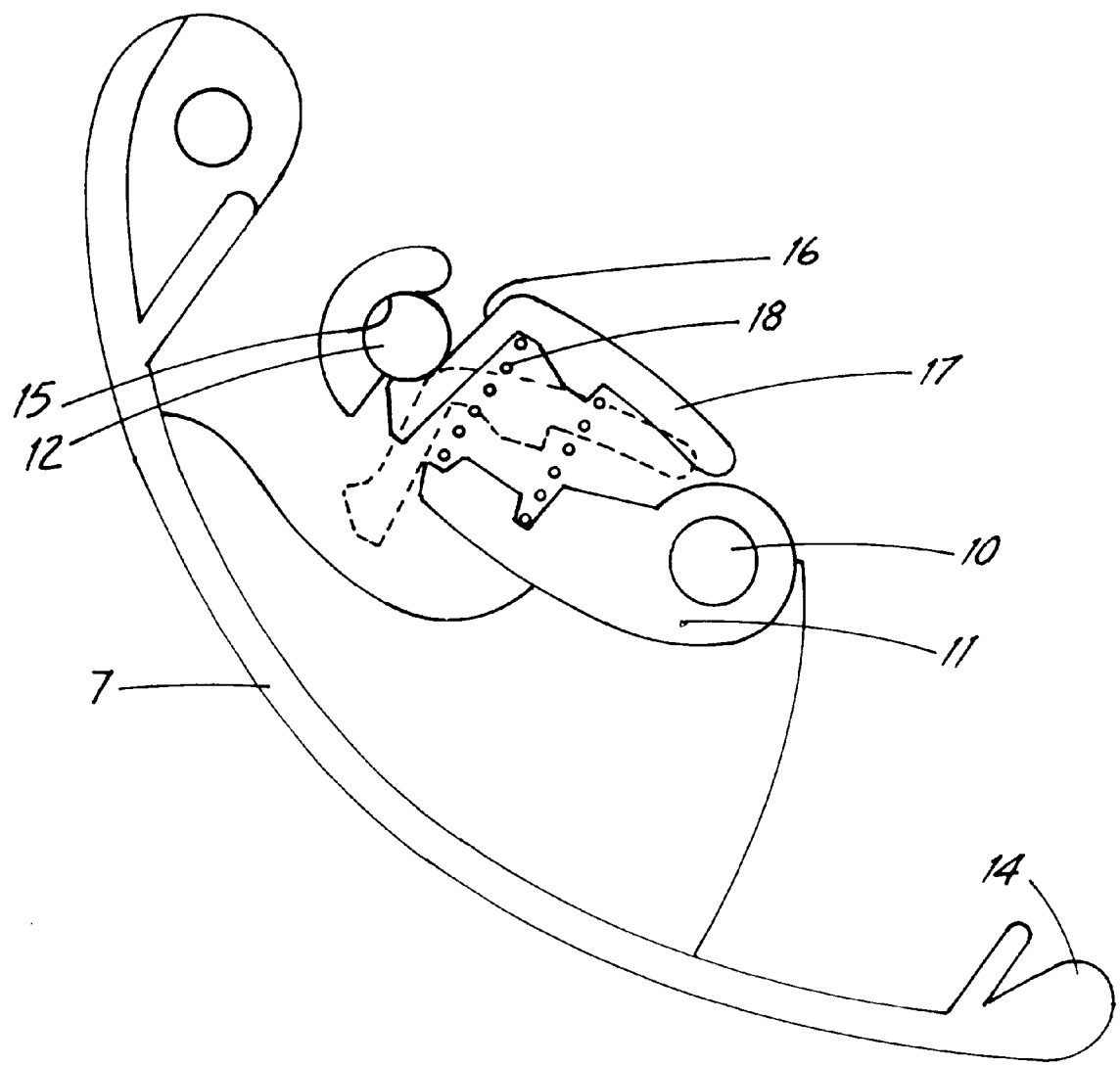
FIG. 4 is a further enlarged very schematically shown sectional view of the operating means in order to illustrate the locking means thereof.

The latter connection is clearly shown in FIG. 4 illustrating the operating means 6 on a larger scale. As is mentioned in relation to FIGS. 2 and 3, the pin 12 as shown belongs to the securing element 13 which is secured to the frame 3 and is therefore to be considered as a stationary pin. In the mounted position of the operating means 6, this pin 12 acts as pivot for the intermediate element 11 and is accommodated in a socket 15 for this purpose. The socket 15 is more or less completed by a face 16 of a locking member 17 which, in this case, is constructed as a push button pivoting around the pivot 10. This locking means 17 is movable between a locking position indicated by uninterrupted lines in FIG. 4 and an unlocking position shown by interrupted lines. A helical pressure spring or such spring member 18, acting between the locking member 17 and the intermediate element 11, loads the locking member 17 in a direction to the locking position and the locking member 17 is movable against the spring force of the pressure spring 18 to the unlocking position. In the locking position, the face 16 of the locking member 17 is positioned such with respect to the socket 15 that the pin 12 is not able to move out of the socket 15, whereas in the unlocking position the face 16 is moved away from the socket 15 such that there is created an opening which is sufficient to allow passage of the pin 12. The operating means 6 and the locking member 17 thereof are constructed such that, upon a pressure on the locking member 17 in order to move it to the unlocking position, the operating means 6 is also lent a movement which releases the operating means 6 from the pin 12 of the securing element so that unlocking and releasing the operating means 6 is done in one action. In order to remount the operating means 6 it is only necessary to push the intermediate element 11 against the pin 12 such that the pin 12 urges the locking member 17 to the unlocking position and in the same movement the pin is able to move into the socket 15, whereafter the locking member 17 automatically returns to the locking position by means of the pressure spring 18 thereby accomplishing the mounting operation of the operating means 6.

The invention is not restricted to the embodiments described herein before and shown in the drawing which may be varied in different manners within the scope of the invention as defined in the claims. For example, it is possible to construct the locking member as a slide or the like.

I claim:

1. An apparatus for manually moving a closure panel of an open roof construction for a vehicle between closed and opened positions, said apparatus comprising:
    a first element;
    a second element adapted to be secured to a frame of the open roof construction wherein the first element is removably connected to the second element;
    a lock adapted to hold the first and second elements in a connected position, said lock including:
        a locking member being displaceable between locking and unlocking positions;
        a spring operably connected to the locking member and configured to apply a force in a first direction to load the locking member to the locking position; and
    wherein a releasing movement of the second element with respect to the first element is substantially opposed to the first direction.

2. The apparatus according to claim 1, wherein the second element is disposed to contact and move the locking member from the locking position to the unlocking position while the open roof construction is in a closed position.

3. The apparatus according to claim 1, wherein the locking member comprises a pivotable lever.

4. The apparatus according to claim 1, wherein the second element includes a pin to which the locking member can engage and about which the first element can pivot in the locking position.

5. The apparatus according to claim 1, wherein the second element is a securing element, and further including a panel element pivotally connectable to the closure panel, the first element being pivotally connected to the panel element and the securing element.

6. An apparatus for manually moving a closure panel of an open roof construction for a vehicle between a closed position and an upwardly tilted open position, said apparatus comprising:
    a securing element securable to a frame of the open roof construction;
    an intermediate element pivotally and releasably connected to the securing element;
    a handle pivotally connected to the intermediate element and pivotally connectable to the closure panel, the handle adapted to manually move the apparatus between a stable set-out position in which the closure panel is open and a stable closed position in which the closure panel is closed; and
    wherein the intermediate element is removably connected to the securing element and is held in a connected position by a lock, said lock including a locking member which is displaceable between locking and unlocking positions, said locking member being loaded in a first direction to said locking position by a spring, wherein a releasing movement of the intermediate element with respect to the securing element is substantially opposed to the first direction.

7. The apparatus according to claim 6, wherein the handle and the intermediate element are movable through a toggle position in the open and/or closed position, beyond which a stable position is obtainable.

8. An apparatus for manually moving a closure panel of an open roof construction for a vehicle between a closed position and an upwardly tilted open position, said apparatus comprising:
    a securing element securable to a frame of the open roof construction;
    an intermediate element removably and pivotally connected to the securing element;
    a handle pivotally connected to the intermediate element and pivotally connectable to the closure panel, the handle adapted to manually move the apparatus between a stable set-out position in which the closure panel is open and a stable closed position in which the closure panel is closed;
    a lock adapted to hold the securing element in the connected position, such lock including:
        a locking member which is displaceable between locking and unlocking positions;
        a spring operably coupled to the locking member to load the locking member in a first direction to the locking position; and
    wherein a mounting movement of the intermediate element with respect to the securing element is in substantially the first direction.

9. An open roof construction for a vehicle having a roof opening and a frame, the open roof construction comprising:
    a closure panel for selectively closing or opening the roof opening;
    an apparatus for manually moving the closure panel between closed and opened positions, said apparatus comprising:
        a first element;
        a second element removably connected to the first element and securable to the frame;
        a lock adapted to hold the second element in a connected position, said lock including:
            a locking member displaceable between locking and unlocking positions;
            a spring operably coupled to the locking member to load the locking member in a first direction to the locking position; and
        wherein a releasing movement of the first element with respect to the second element is in a direction substantially opposed to the first direction.

* * * * *